United States Patent
Brandon et al.

[15] 3,690,639
[45] Sept. 12, 1972

[54] HELICALLY WOUND LAMINATED BEARINGS AND METHOD OF MANUFACTURE

[72] Inventors: William D. Brandon; Jack A. Drais, both of Peoria, Ill.

[73] Assignee: Caterpillar Tractor Co., Peoria, Ill.

[22] Filed: Oct. 5, 1970

[21] Appl. No.: 77,819

[52] U.S. Cl. .................................................267/57.1
[51] Int. Cl. ....................................................F16c 1/10
[58] Field of Search .....................267/57.1; 156/184

[56] References Cited

UNITED STATES PATENTS

| | | | |
|---|---|---|---|
| 3,504,902 | 4/1970 | Irwin | 267/57.1 |
| 3,083,065 | 3/1963 | Hinks et al. | 267/57.1 |

Primary Examiner—James B. Marbert
Attorney—Fryer, Tjensvold, Feix, Phillips & Lempio

[57] ABSTRACT

An improved cylindrical bearing material of a laminated construction employs a plurality of alternating cylinderical shells of elastomer and metal laminated together in which each metal shell is formed by helically winding a band of the metal in an edgewise, abutting relationship to form a cylindrical metal shell or sleeve. The resulting bearing material, composed of a plurality of alternating concentric elastomeric and metallic shells can be confined between a cylindrical core and an outer cylindrical retaining ring to form a bearing assembly in which the bearing material may be placed under a radial preload, if desired, to decrease its radial deflection when it is placed under radial loads. In the preferred embodiment of the invention, the adjacent metal shells are wound in opposite directions to stabilize the bearing material under torsional loading.

17 Claims, 10 Drawing Figures

PATENTED SEP 12 1972
3,690,639
SHEET 1 OF 3
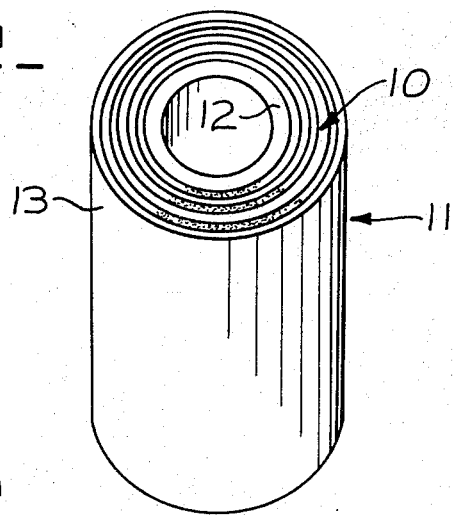
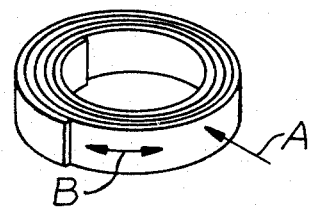
PRIOR ART
Fig_1_
Fig_2_
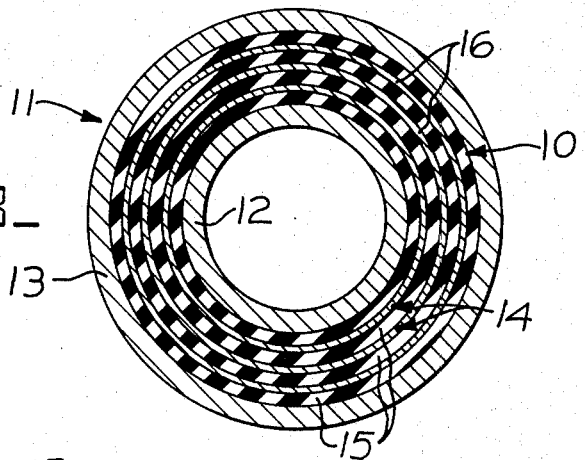
Fig_3_
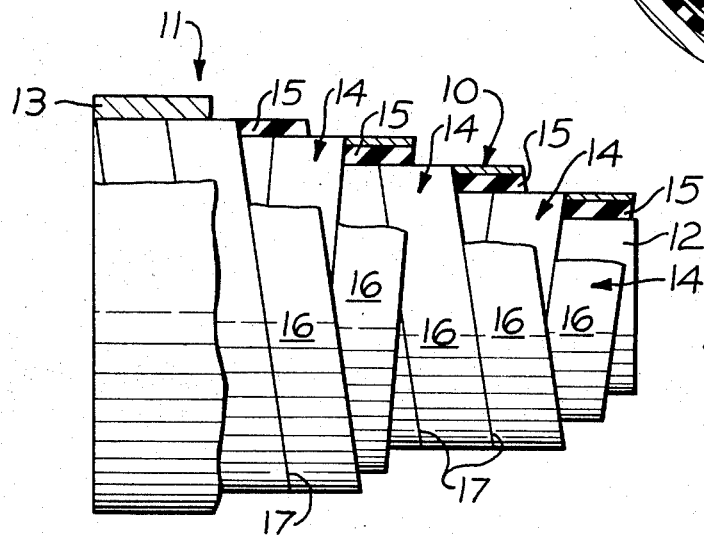
Fig_4_
INVENTORS
WILLIAM D. BRANDON
JACK A. DRAIS
BY
Fryer, Tjensvold, Feix, Phillips & Lempio
ATTORNEYS

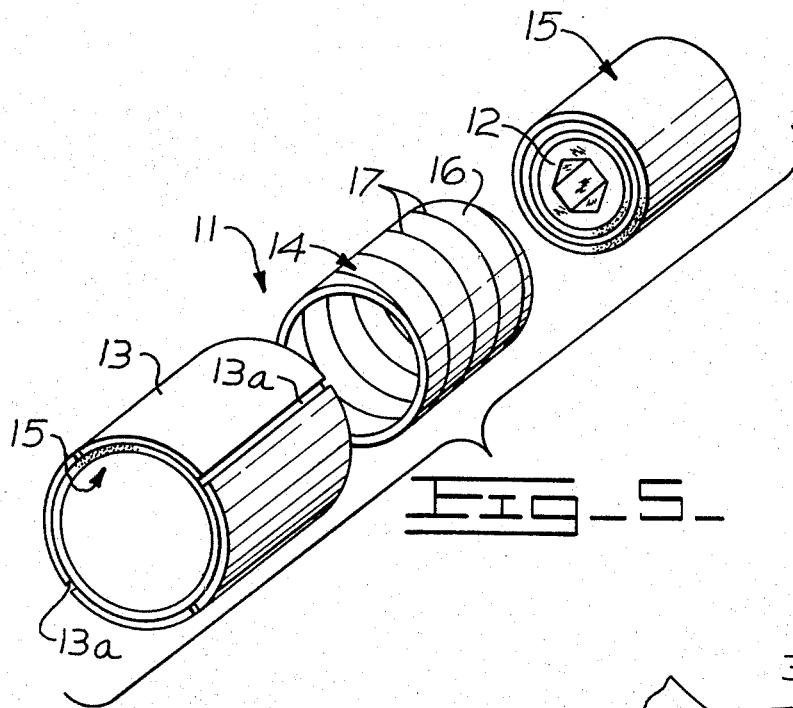
Fig_5_
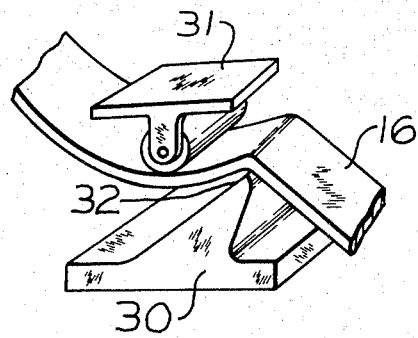
Fig_7_
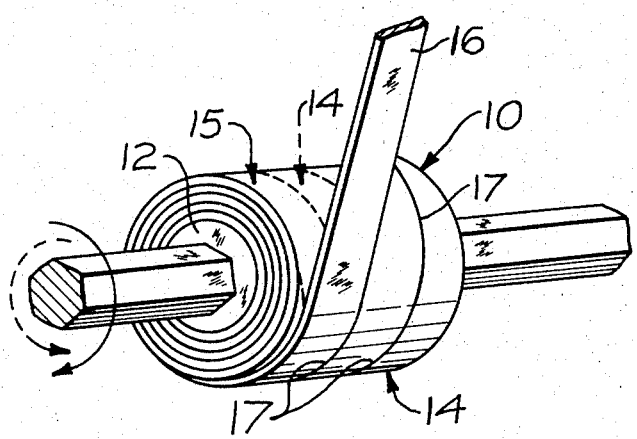
Fig_6_

PATENTED SEP 12 1972
3,690,639
SHEET 3 OF 3
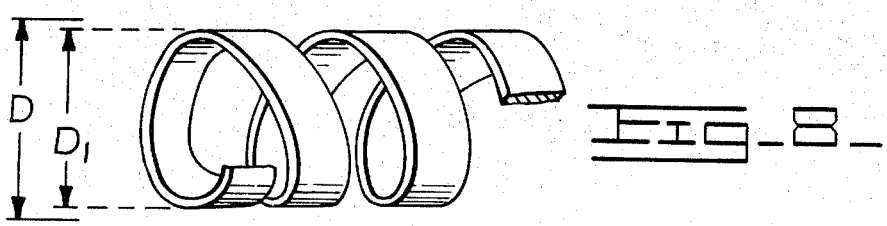
Fig_8_
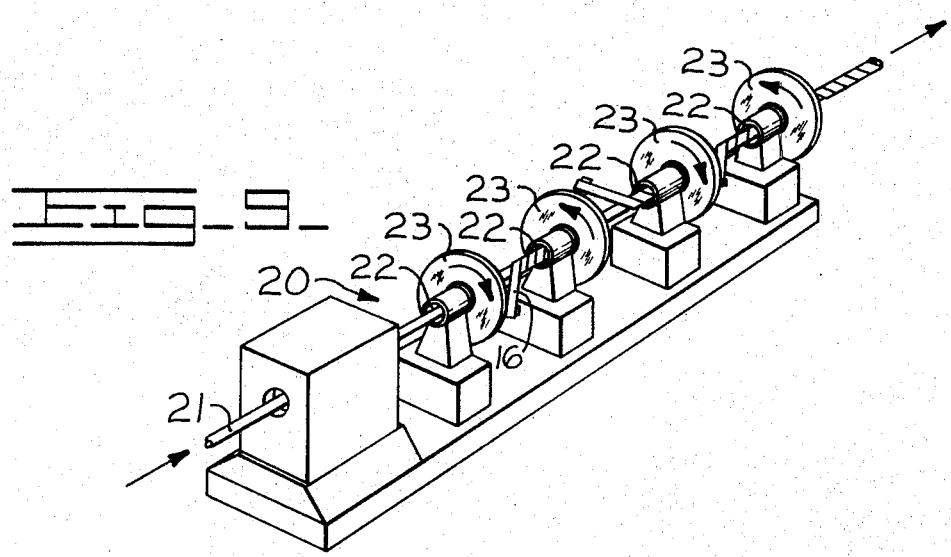
Fig_9_
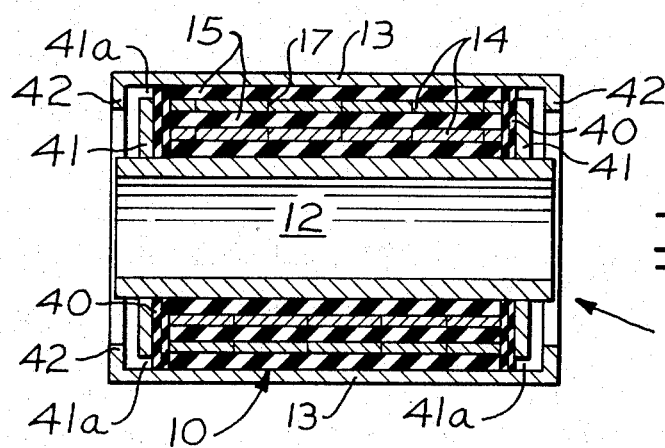
Fig_10_
INVENTORS
WILLIAM D. BRANDON
JACK A. DRAIS
BY
Fryer, Tjensvold, Feix, Phillips & Lempio
ATTORNEYS

HELICALLY WOUND LAMINATED BEARINGS AND METHOD OF MANUFACTURE

BACKGROUND OF THE INVENTION

In particular, the instant invention is related to bearings employing alternate layers of metal and elastomers to form laminated bearing structures, as disclosed in U.S. Pat. No. 3,071,422 issued to Hinks. In these laminated bearing structures, the layers of the bearings are kept relatively thin with the thickness of the elastomer layer being usually under 0.05 inch in thickness to limit bearing deflection when a force is applied normal to the elastomer layers.

Fabrication of bearings of this type is usually accomplished by employing a continuous metallic strip preferably coated with elastomers on one or more sides or faces, which is wound spirally about an axis of revolution to form a bearing laminate wherein the metal layer is separated by an elastomer layer, thereby forming a spiral laminated structure. While it is not necessary to apply the elastomer layer to the metal layer before it is wound, it is usually more convenient since the elastomer can be sprayed, painted or otherwise deposited on one or more faces of the metallic strip employed to form the bearing.

Bearings constructed according to the above teachings have been quite satisfactory in a number of applications. However, when bearings of this type are subjected to high radial loading and torsional loadings, the adjacent metal layers shift, placing elastomer layers under tension as well as causing deflection, thereby limiting the performance and service life of such bearings due to the deterioration of the elastomer layers.

The prior art bearings of this type fabricated for radial loading applications are typically represented by the structure shown in FIG. 1 of the above-referenced Hinks patent wherein the metallic strip coated with elastomer is wound in a superimposed spiral on a core to form a bearing laminate.

In such a bearing structure formed of an uninterrupted spiral, torsional loading would cause the bearing to materially stiffen in one torsional direction and lessen in the opposite torsional direction developing high localized stresses. In both situations the metal layer tends either to wind up the spiral or unwind the spiral causing a shifting in the metal layers of the bearing structure, placing the elastomer layers under tension and subjecting them to damage. U.S. Pat. No. 3,235,941, issued to Krotz, recognized this characteristic, and in order to avoid the resulting problems in differential tensional stiffness found in the spirally wound laminate bearings, employed a plurality of notches in the metal strip forming the spiral in order to form a plurality of individual connected "plates" through the interruptions caused by the notches thereby achieving the same stiffness to torsional loading in both directions. Krotz indicated that an alternative of a large number of concentric sleeves of metal and elastomer in such a bearing would be difficult, if not impossible, to manufacture.

One of the problems of employing the concept set forth in the Krotz patent is that the large number of sharp edges which are formed about the notches tend to "cut" or "chew" the elastomer as the bearing is deflected torsionally under radial loading thereby seriously limiting the service life of the elastomer. Since the elastomer is substantially incompressible, if "flows" into the notches under radial loadings (compression) where the edges "chew" the elastomer causing progressive deterioration. In U.S. Pat. No. 3,377,110, a preloaded laminated radial bearing structure is disclosed employing segments or stacks formed of laminated bearing material in order to avoid some of the problems experienced with the continuous spiral wound bearings disclosed in the above-referenced Hinks and Krotz patents. However, due to the limited number of segments which can be employed in the bearing design, it has only a limited radial load capacity. Further, the large number of edges of the metal layers in each stack tend to cut and damage the elastomer if the bearing is torsionally deflected under radial loading thereby limiting its service life. Due to the void areas in the above-referenced types of bearings having uniform torsional stiffness, it is desirable to carefully locate and orient the bearings so that the highest radial loads did not occur in the area of slots or openings, representing the lowest bearing strength where loading often tends to increase abrupt changes in the contour of or causes diametral ridges in the metal layers which can result in stress risers and consequently premature failure of the bearing material.

It is an object of the instant invention to overcome the above problems in laminate bearings designed for high radial loading applications by a new fabrication for a laminated cylindrical bearing material wherein the alternate layers of elastomer and metal are formed of concentric cylindrical shells which will allow torsional loadings to be distributed uniformly throughout the bearing material when it is under high radial loadings without damage to the elastomer layers thereby providing exceptional service life.

SUMMARY OF THE INVENTION

The instant invention accomplishes the above principal object with a cylindrical laminated bearing material including a plurality of concentric alternate sleeves or shells of metal and elastomer with each of said metal sleeves or shells formed by helically winding a strip or band of metal about a constant diameter in an edged-abutting relationship to form each metallic sleeve or shell with a thin layer or shell of elastomer disposed between each adjacent metal sleeve or shell. Generally, the cylindrical laminated bearing material is built on a mandrel by successively superimposing on its innermost sleeve or shell a plurality of subsequent alternating sleeves or shells of elastomer and metal with each metal shell formed by winding a band of metallic material in an edge-abutting relationship about a substantially constant diameter over a prior shell. The metal band which is helically wound in an edge-abutting relationship may be coated with elastomer to form the intermediate elastomer shell between adjacent metal shells as the metallic shell is formed, if desired. Also, it is preferable to alternate the direction of winding when metal shells are formed by winding the metal band in an opposite direction whereby the seams in adjacent metallic shells will be angularly disposed relative to the seams in the adjacent shells.

BRIEF DESCRIPTION OF THE DRAWINGS

The invention will be more easily understood from a detailed description of the preferred embodiment taken in conjunction with the attached drawings wherein:

FIG. 1 is a perspective of a typical prior art laminated bearing designed for radial loads;

FIG. 2 is a perspective of a cylindrical bearing structure formed with the new bearing material according to this invention;

FIG. 3 is a radial section of the bearing structure illustrated in FIG. 2;

FIG. 4 is a side elevation of the bearing structure shown in FIG. 1 with parts broken away to show additional detail of its multiple alternating shells of metal and elastomer;

FIG. 5 is an exploded perspective of a bearing assembly employing the novel laminated cylindrical bearing material, illustrating the construction of one of the metallic bearing shells or sleeves;

FIG. 6 is a perspective of the application of a metallic band by a helically winding operation, illustrating one method of its manufacture on a powered rotating mandrel;

FIG. 7 is a perspective of simple dies employed to put a "curl" in the metal band as it is wound into a metallic shell;

FIG. 8 illustrates the "curl" in perspective of a metallic band passed through the dies shown in FIG. 7;

FIG. 9 is a perspective of a typical winding machine which can be employed to manufacture the novel bearing material; and FIG. 10 is an elevation of a bearing structure having end-loaded elastomer washers.

BACKGROUND OF THE INVENTION

While laminated bearings of the type disclosed in the referenced prior art patents generally allow a significant reduction in both size and weight in a given application over their contemporary elastomer counterparts, they have been unsuitable in certain applications. With no metal-to-metal sliding surfaces, they do eliminate wearing, galling and fretting without any requirement for lubrication as does the current invention. Also, they eliminate the "break out" forces normally found in more conventional bearings. Since both initial costs and maintenance costs of these laminated bearings are low, they are attractive for applications which are compatible with their characteristics and capabilities.

In the past, as noted above, the characteristics and capabilities of the prior art laminated bearings have not been satisfactory for applications in which high radial loadings are involved which are accompanied by torsional deflections between articulated parts; for example, bearings between connected track links on track-type vehicles. The current invention is designed to provide a laminated cylindrical bearing material having the capabilities for such applications involving high radial loadings, coupled with torsional deflections.

A typical prior art bearing of a laminated construction designed for radial loadings is illustrated in FIG. 1 with arrow A representing radial loadings and arrow B representing torsional loadings on the spirally wound laminated bearing. In contrast, the construction of the cylindrical bearing material 10 of the current invention is illustrated in FIGS. 2, 3, 4, 5, and 6, and differs appreciably in design and construction from the prior art bearing in that concentric and alternating cylindrical shells of elastomer and metal form the circular bearing material.

In FIGS. 2, 3, 4, and 5, the bearing material 10 is illustrated assembled in a bearing structure 11 which confines it between an inner circular core 12 and an outer retaining sleeve 13, the latter of which may be segmented, as illustrated in FIG. 5. The functions of the inner core and the retaining sleeve are normally to provide convenient assemblies for mounting the new bearing material in its various bearing applications. Thus, it is apparent that these functions could also be provided, in some situations, by appropriate structures on or in the machine itself, thereby eliminating the necessity of core and retaining sleeve.

In some situations where high radial loading will be experienced and limited radial deflection in the bearing material is desired, the retaining sleeve 13 (the unsegmented types) can be swaged or the inner core 12 ballized to place the bearing material under a radial pre-load, thereby reducing radial deflections, i.e., increasing radial stiffness. In the case of a segmented retaining sleeve, as illustrated in FIG. 5, the mating bearing support structures can be employed to "squeeze" the retaining sleeve to a smaller diameter (closing the gaps 13a) to apply a radial pre-load when the bearing structure is installed in a machine application.

The actual configuration of the new bearing material is best shown in FIGS. 3, 4, and 5 wherein the wall thicknesses of the several shells are greatly exaggerated solely for the purposes of illustration, since wall thickness of the metallic shells 14 may be in the order of 0.0015 to 0.020 inches and the wall thickness of the elastomer shells 15 may be in the order of 0.005 to 0.060 inches.

The alternating shells 14 and 15 of elastomer and metal, respectively, are formed usually by building the bearing material 10 on a mandrel, laying up a first cylindrical shell on a mandrel or core 12 and subsequently laying up each successive shell on an immediate prior shell until the desired thickness of bearing material is achieved. Each metallic shell 14 is applied separately over an immediate prior shell, and a number of metallic shells can be applied simultaneously by wrapping a second metallic shell over one just completed with an intermediate elastomer shell therebetween. A machine arrangement similar to one illustrated in U.S. Pat. No. 3,128,216 issued to Reed can be employed to fabricate the bearing material 10. Employing such a machine, an axially continuous length of bearing material can be formed (lengths of 20 to 40 feet) which then can be cut radially into selected shorter lengths.

In FIG. 9, a perspective of a wrapping machine 20 is illustrated in which a non-rotating mandrel 21 is axially advanced through apertures 22 of the several rotating winding decks 23, each of which contains spools wound with a metallic band 16, preferably a shim stock of the thicknesses indicated above, which may be brass-plated for improved adhesion. The axial advance of the mandrel is timed so the metallic bands 16 are helically wound in a substantially edge-abutting relationship making a tight abutting seam 17 between the convolutions of the helix forming each metallic shell of the cylindrical bearing material.

In FIGS. 5 and 6, an important feature of the application of the metallic band 16 to a prior shell (elastomer shell 15) is illustrated. Each metallic band 16 is helically wound in tight edge-abutting relationship about a constant diameter and under tension, so the seams 17 will have a minimum "gap" and form a substantially continuous cylinder.

It should not be inferred from the above discussion that an elastomer shell 15 cannot be formed simultaneously with the metallic shell, as would be the case where the metallic band is coated with an elastomer on one or more of its faces before it is helically wound on the mandrel or a prior shell. Also, it should be appreciated that each subsequent metallic band is preferably wound in the opposite direction (see arrows on the winding decks 23 in FIG. 9), often referred to as opposite hand, so the seams 17 of the adjacent metallic shells 14 are angularly disposed relative to the seams in the referenced metallic shell.

The alternation of the direction of warp between adjacent shells is very important when the cylindrical bearing material 10 is placed under torsional loadings since it makes the torsion stiffness uniform in either direction. The characteristic is obtained because adjacent helically wound metallic shells 14 tend to oppose one another under torsional loadings, one tending to wind-up, the other tending to unwind, depending on the direction of torsional deflection thereby providing the same compensation and torsional stiffness in either direction. This feature tends to maintain the elastomer shells under compression by limiting relative movement between the metallic shells and also helps avoid the highly localized shear forces developed in spirally wrapped prior art bearings. In addition, the metallic shells can lengthen or shorten axially to accommodate changes in the shell diameter during torsional deflections.

Another very important feature is achieved by the instant fabrication through a unitized bearing material in which "flow" of the elastomer is restricted when the bearing material 10 is placed under load, thereby limiting the deterioration of the elastomer caused by its working across a plurality of edges of the metallic portions of the laminate. Since elastomers are substantially incompressible, they tend to flow when placed under compressive loading (radial loading in the case of the instant invention) and bulge along and at the unrestricted edges of the laminate. This action can only occur to a limited degree at the opposite ends of the circular bearing material 10 since the multiple concentric metallic shells 14 having tight seams 17 restrict the "flow" of the elastomer internally, increasing radial stiffness and greatly lengthening their service life. It also allows the use of somewhat thicker elastomer shells whereby decreased torsional stiffness can be achieved without appreciable loss of radial stiffness.

A technique to enhance the integrity of the bearing material 10 when not confined between an outer retaining sleeve 13 and an inner core 12 is to place a "-curl" in the metallic band 16 as it is being wound using a simple sharp edge die 30 as illustrated in FIG. 7. A guide 31 "back bends" the metallic band so it is drawn across the edge 32 of the die in its travel toward the mandrel when winding on the prior shell. As a result of this action, a "curl," as illustrated in FIG. 8, can be introduced into the band. By controlling the tension on the band and spacing between the die and guide the diameter $D_1$ of the "curl" in a free state can be obtained which is less than the diameter D of the cylindrical metallic shell 14 formed from the band. This curl tends to prevent unraveling of the outer metallic shells of the bearing material. Also, when the bearing material is layed-up on a machine, its ends should be "clamped" to maintain the tightness of the wrap as each metallic sleeve is completed.

The elastomer employed in the fabrication can be selected from rubbers, natural, synthetic, silicone, viton, etc., which can be compounded for desired elastomeric properties such as hardness, modulus, set, hysteresis set, resiliancy, thermal stability, etc. Also, since the metallic shells can be wound under considerable tension, some of the undesirable characteristics, such as "elastomer relaxation" can be compensated for during fabrication. In addition, it allows the use of elastomers which are cured, uncured, bonded or unbonded to the metallic shells in final bearing material, increasing the flexibility in achieving the desired parameters.

Normally, the metallic shells 14 will be formed of shim stock, though the use of non-metallic material is possible if it maintains the necessary effective shape factor and has the other properties required.

Since there are no essential breaks or gaps in the concentric shells forming the laminate of this new bearing material 10, except at its ends, the radial and torsional stiffnesses are uniform through 360° so no special bearing orientation with reference to the applied load is necessary. Also, since the material is unitized, it can accept greater conical loadings than other similar types of laminated bearings, though such edge-loading is undesirable.

In FIG. 10, the bearing structure 11 is shown equipped with washer layers 40 disposed normal to the concentric shells at each end of the bearing material 10. These thin washer layers are retained tightly against their respective ends of the bearing material 10 by washers 41 which are secured to the core member 12 usually by a press-fit. Generally, it is desirable that the washer layers be placed under pre-load to prevent the extrusion of elastomer from between the adjacent metallic shells when the bearing is placed under high radial loads.

As can be seen in FIG. 10, the washers 41 do not extend to the outer sleeve 13, but leave an annular gap 41a which should be larger than the maximum radial deflection of the bearing material. Also, the outer ends 42 of the retaining sleeve 13 can be crimped, as illustrated in FIG. 10, to overlap the washers. This tends to keep dirt out of the bearing and also forms a "stop," limiting axial deflections across the bearing material which has little resistance to axial loadings.

The precompression of the bearing material during manufacture ultimately will depend on the ratio of the moduli of elasticity of the metal and elastomer forming the laminated concentric shells. Uncured rubber can be accurately calendered on the metallic band to the desired thickness, and initial bearing loads can be determined by the of the cylindrical bearing can be maintained within a few thousandths even though there is some "relaxation" when the bearing material is removed from the winding machine.

Often it is desirable to use flat stock to form the outer retaining sleeve 13 by forming it in segments, as shown in FIG. 5, and employing the attaching assemblies to provide the preload as previously described.

Subsequent to the build-up of the concentric shells described above, the elastomers can be cured and normally will bond to the shim stock forming the metallic shells. However, it is not always imperative that the elastomer be bonded to the metallic shells.

After curing, the elastomer shells tend to be relieved of internal stresses and precompression if the cylindrical bearing material can be accomplished as previously described.

A cylindrical bearing was fabricated having approximately a 3 ½ inch diameter with six shells of rubber each having a wall thickness of 0.036 inch with five metallic shells disposed between the rubber shells having a wall thickness of 0.010 inch and cured. Thereafter, the bearing material was preloaded by ballizing the inner core to give from 5 to 16 percent precompression of the material. This bearing was mounted in a test assembly where it underwent 1,000,000 impulse cycles of a 100,000-lb. radial load, and 1,700,000 flex cycles from ±1° to ±5°, without failure. Radial deflection was 0.004 inch nominal and 0.007 inch maximum.

We claim:

1. A cylindrical laminated bearing material suitable for radial and torsional loadings comprising a plurality of alternating concentric elastomer and non-elastomer cylindrical bearing shells, each non-elastomer bearing shell having a continuous non-elastomer flat band disposed in circular convolutions having substantially helical edge-abutting relationships along a cylindrical axis to form a cylindrical bearing shell with a substantially constant diameter, and said elastomer and non-elastomer cylindrical bearing shells being successively superimposed on the innermost shell to form a cylindrical laminate with a plurality of concentric shells.

2. The cylindrical laminated bearing material as defined in claim 1 wherein an elastomer cylindrical bearing shell is disposed between adjacent non-elastomer cylindrical bearing shells whereby concentric non-elastomer cylindrical bearing shells are separated in the cylindrical laminate by elastomer cylindrical bearing shells.

3. The cylindrical laminated bearing material as defined in claim 2 wherein each elastomer cylindrical bearing shell is bonded to the contiguous non-elastomer cylindrical bearing shells.

4. The cylindrical laminated bearing material as defined in claim 1 wherein the non-elastomer flat band is a metal band.

5. The cylindrical laminated bearing material as defined in claim 4 wherein the metal band is a brass-plated steel shim stock having a thickness from 0.020 to 0.0015 inches.

6. The cylindrical laminated bearing material as defined in claim 4 wherein the elastomer is a rubber compounded for the desired characteristics.

7. The cylindrical laminated bearing material as defined in claim 5 wherein each elastomer cylindrical bearing shell has a wall thickness from 0.005 to 0.060 inches.

8. The cylindrical laminated bearing material as defined in claim 2 wherein each elastomer cylindrical bearing shell is applied in an uncured state and is cured and bonded to its contiguous non-elastomer cylindrical bearing shells.

9. The cylindrical laminated bearing material as defined in claim 2 wherein the non-elastomer band in each successive non-elastomer cylindrical bearing shell is disposed at an angle to the non-elastomer band in the immediately preceding non-elastomer cylindrical bearing shell whereby substantially uniform bi-directional torsional response is obtained.

10. The cylindrical laminated bearing material as defined in claim 9 wherein the non-elastomer bands in adjacent non-elastomer cylindrical bearing shells are helically disposed at equal but opposite angles with reference to the axis of the cylindrical laminate.

11. A laminated bearing for radial and limited torsional loadings comprising a core having a cylindrical outer surface, and a plurality of concentric elastomer and metallic cylindrical bearing shells successively superimposed on said core to form a cylindrical layered laminate thereon, each metallic cylindrical bearing shell formed by a metal band helically disposed in an edge-abutting relationship to form a metallic cylinder with a helical seam which has a substantially constant diameter.

12. The bearing as defined in claim 11 wherein the bearing includes an outer cylindrical retaining member which is contiguously disposed on the outermost cylindrical bearing shell of the cylindrical laminate.

13. The bearing as defined in claim 11 wherein the adjacent metallic cylindrical bearing shells forming the cylindrical laminate are separated by elastomer cylindrical bearing shells.

14. The bearing as defined in claim 12 wherein the plurality of concentric elastomer and metallic cylindrical bearing shells are compressed between the outer retaining member and the outer cylindrical surface of the core to decrease its radial deflection in the resulting bearing.

15. The bearing as defined in claim 12 wherein the outer retaining member is segmented with gaps between the ends of its segments whereby the cylindrical laminate between the core and said outer retaining member can be compressed by closing such gaps when the bearing is installed in cooperating structures to decrease radial deflection in the installed bearing.

16. The bearing as defined in claim 13 wherein the elastomer cylindrical shells are cured and bonded to their contiguous metallic cylindrical bearing shells.

17. The bearing as defined in claim 11 wherein the metal bands forming the metallic cylindrical bearing shells are cold-worked to induce a curl in said metal bands approximately the diameter of the cylindrical laminate when they are wound.

* * * * *